United States Patent [19]
Koyama et al.

[11] Patent Number: 5,871,570
[45] Date of Patent: Feb. 16, 1999

[54] FLAME-RETARDANT RESIN COMPOSITION

[75] Inventors: Tadashi Koyama; Kenji Mogami, both of Osaka; Masahiro Asada, Hyogo, all of Japan

[73] Assignee: Kanegafuchi Kagaku Kogyo Kabushiki Kaisha, Osaka, Japan

[21] Appl. No.: 952,652

[22] PCT Filed: May 24, 1996

[86] PCT No.: PCT/JP96/01376

§ 371 Date: Nov. 24, 1997

§ 102(e) Date: Nov. 24, 1997

[87] PCT Pub. No.: WO96/37555

PCT Pub. Date: Nov. 28, 1996

[30] Foreign Application Priority Data

May 26, 1995 [JP] Japan ................................. 7-152715

[51] Int. Cl.⁶ .............................. C09K 21/12; C08K 5/52
[52] U.S. Cl. ...................... 106/18.18; 428/921; 524/140; 524/141; 524/143; 252/601; 252/609
[58] Field of Search ........................ 106/18.18; 428/921; 524/140, 141, 143; 252/601, 609

[56] References Cited

U.S. PATENT DOCUMENTS 4,927,870  5/1990  Ogoe et al. ............................. 524/140

FOREIGN PATENT DOCUMENTS

| 0 594 021 A2 | 4/1994 | European Pat. Off. |
| 2-92961 | 4/1990 | Japan |
| 4-36346 | 2/1992 | Japan |
| 6-192553 | 7/1994 | Japan |

*Primary Examiner*—Anthony Green
*Attorney, Agent, or Firm*—Armstrong, Westerman, Hattori, McLeland & Naughton

[57] ABSTRACT

There is dsiclosed a flame retardant resin composition comprising the following components (A), (B), (C), (D), (E) and (F), wherein 1–10 parts by weight of (C), 2–10 parts by weight of (D), 0.05–2 parts by weight of (E) and 0.01–10 parts by weight of (F) are contained per 100 parts by weight of a resin whose weight ratio of (A)/(B) is 75/25–90/10.

(A) a polycarbonate resin whose viscosity-average molecular weight is 16,000–29,000, (B) a polyalkylene terephthalate resin, (C) a copolymer containing a rubbery polymer and at least one selected from the group consisting of aromatic vinyl monomers, vinyl cyanide monomers, acrylic acid, acrylic esters, methacrylic acid, methacrylic esters and maleimide-type monomers as components, (D) an organic phosphorus-type flame retardant, (E) a fluorocarbon-type resin, and (F) an epoxy compound not containing halogens.

The flame retardant resin composition is halogen-free and possesses well-balanced properties of flame retardancy, impact strength, heat resistance, moldability, chemical resistance and heat-induced discoloration resistance, and is improved in silver streaks formation.

4 Claims, No Drawings

FLAME-RETARDANT RESIN COMPOSITION

TECHNICAL FIELD

The present invention relates to a halogen-free and flame retardant resin composition excellent in physical properties such as impact strength, heat resistance and moldability, which is also excellent in chemical resistance and heat-induced discoloration resistance, and improved in silver streaks.

BACKGROUND ART

Of molded articles, electric and electronic parts used in an OA (Office Automation machines)-field for some specific uses are required to be of resin compositions excelled in physical properties such as flame retardancy, impact strength and heat resistance. For example, required are those not less than 40 kg-cm/cm in notched Izod impact strength and heat resistance of not less than 100° C. in HDT (heat distortion temperature). Besides those properties, chemical resistance and moldability are further required. As such resin compositions, polycarbonate-type resins or ABS resins are being used widely.

In recent years, especially with resins used as materials of electric or electronic parts, are required to be safe to fire, hence the material resins are often required to have a high degree of flame retardancy to pass UL-94 (U.S. Underwriters Laboratory Standard) V-0 and, therefore, various flame retardants have been developed and studied.

For the impartation of such a high degree of flame retardancy to a resin composition, generally used is a halogen-type compound as a flame retardant, if necessary, in combination with a flame retardant auxiliary such as antimony trioxide. Halogen-type compounds with their high flame retardant effect, however, have such defects as free halogen gases or halogen compounds resulting from the decomposition of the halogen-type compounds during resin processing is likely to cause corrosion of an extruder cylinder or die surface or corrosion of metal portions of electric or electronic parts, which possibly causes contact failure or poor conduction. The gases resulting from the decomposition of the halogen-type compounds include poisonous ones in extremely minute amounts, Hence, strongly desired is development of a flame retardant resin composition not containing even traces of halogen-type compounds.

As one of such flame retardants, a kind of phosphorus-type compounds is being studied in good earnest with regard to their application possibilities. Generally, however, the flame-retarding effect of the phosphorus-type compounds is lower than that of halogen-type ones, hence addition of a greater amount thereof is required if a high degree of flame retardancy is needed. And this results in lowering of physical properties such as impact strength and heat resistance and it comes to be extremely difficult to keep them sufficiently high together with flame retardancy.

Various studies have been made to date for solving such problems and resin compositions comprising polycarbonate resins, polyalkylene terephthalate resins, graft copolymers, phosphorus-type compounds and fluorocarbon-type resins with or without limitations of their blending ratios are disclosed in, for example, Japanese Laid-open Patent Publication No. 6-192553 and Japanese Patent Publication No. 6-242055.

The resin compositions mixed with such phosphorus-type flame retardants, unlike those mixed with halogen-type flame retardants, have particular phenomena caused by the decomposition of the phosphorus-type flame retardant during resin processing such as yellowing of molded articles and easy formation of silver streaks in the surface thereof. As to yellowing, in particular, there is a further problem, among others, of increased yellowing of the molded articles when they are used under high-temperature conditions.

Of the required physical properties, especially important is the chemical resistance, which is often required to be much higher with spread of uses for such electric parts in recent years.

An extensive series of studies have been made for solving of such problems and with regard to the improvement of resistance to heat-induced discoloration, flame retardant resin compositions admixed with specific organic phosphoric diesters and alkali metal salts thereof as additives for polycarbonate resins are disclosed in, for example, Japanese Laid-open Patent Publication No. 5-9371 and Japanese Laid-open Patent Publication No. 6-207088. Although this method is effective against discoloration of resin compositions dwelling in an injection molding machine, organic phosphoric esters and alkali metal salts thereof accelerate thermal decomposition of polycarbonate resin which enhances silver streaks formation. In Japanese Laid-open Patent Publication No. 6-228426, Japanese Laid-open Patent Publication No. 5-1079 and Japanese Laid-open Patent Publication No. 5-92986 there is disclosed a method for decreasing the degree of discoloration of molded articles by the use of specific phosphoric esters as a phosphorus-type flame retardant. The disclosed method, however, may not be sufficiently effective or, worse, even fail to improve chemical resistance or to prevent silver streaks formation.

For the simultaneous improvement of effect for increasing resistance to heat-induced discoloration and decreasing silver streaks formation, a method of adding organic phosphorus-type compounds and melamine cyanurates to polyamide resins is disclosed in Japanese Laid-open Patent Publication No. 6-145508. The melamine cyanurates, however, accelerate foaming of polycarbonate-type resin and cause increased dripping, hence this method is difficult to apply to polycarbonate-type resin compositions.

Meanwhile, as a method of improving the chemical resistance of polycarbonate resins, there is disclosed in, for example, Japanese Published Patent Publication No. 5-87540, a method of adding graft copolymers and high-density polyethylene resins to a resin composition of polycarbonate resins and thermoplastic polyester resins, but there arises a problem of the resin composition flame retardancy being deteriorated by the high-density polyethylene resins as it is applied to a flame retardant recipe. In Japanese Laid-open Patent Publication No. 5-21754, there is a description about a method of improving the chemical resistance of flame retardant polycarbonate resin compositions using halogenated bisphenol-type epoxy resins, but no reference is made to resistance to heat-induced discoloration or silver streaks formation, and the problems caused by halogen-type compounds are still involved.

Although, as mentioned above, there are proposed various methods for improving resistance to heat-induced discoloration as well as for prevention of silver streaks formation, there are still included problems of the intended improving effect being insufficient or of causing deterioration of the innate excellent physical properties of the resin compositions. Under such conditions, there have been awaited development of halogen-free resin compositions excelled in physical properties such as flame retardancy, impact strength, heat resistance and moldability and, more important, also excelled in chemical resistance and resistance to heat-induced discoloration and silver streaks formation.

The present invention is aimed at providing a halogen-free flame retardant resin composition excelled in physical properties such as flame retardancy, impact strength, heat resistance and moldability and, more important, also excelled in chemical resistance and resistance to heat-induced discoloration and silver streaks formation.

The present inventors made extensive and intensive studies for solving the aforementioned problems and to their astonishment discovered that a flame retardant resin composition satisfying the aforementioned properties was obtainable by blending in specific quantities a polycarbonate resin, a polyalkylene terephthalate resin in specific molecular weight, a specific copolymer, an organic phosphorus-type flame retardant and an epoxy compound not containing halogens, and thus could arrive at the present invention.

DISCLOSURE OF THE INVENTION

The present invention relates to a flame retardant resin composition comprising the following components (A), (B), (C), (D), (E) and (F), wherein 1–10 parts by weight of (C), 2–10 parts by weight of (D), 0.05–2 parts by weight of (E) and 0.01–10 parts by weight of (F) are contained per 100 parts by weight of a resin whose weight ratio of (A)/(B) is 75/25–90/10.

(A) a polycarbonate resin whose viscosity-average molecular weight is 16,000–29,000, (B) a polyalkylene terephthalate resin, (C) a copolymer containing a rubbery polymer and at least one selected from the group consisting of aromatic vinyl monomers, vinyl cyanide monomers, acrylic acid, acrylic esters, methacrylic acid, methacrylic esters and maleimide-type monomers as components, (D) an organic phosphorus-type flame retardant, (E) a fluorocarbon-type resin, and (F) an epoxy compound not containing halogens.

BEST MODES FOR PRACTICING THE INVENTION

The polycarbonate resin (A) used in the present invention is obtained by the reaction of not less than one kind of bisphenol compounds with phosgene or carbonic esters such as diphenyl carbonate.

As specific examples of the bisphenol compounds, there are included hydroquinone, 4,4'-dihydroxyphenyl, 1,1-bis (4-hydroxyphenyl) ethane, 2,2-bis(4-hydroxyphenyl) propane, 2,2-bis(4-hydroxyphenyl) butane, bis(4-hydroxyphenyl) sulfone and 4,4'-dihydroxy diphenyl ether, which are used alone or in combinations of two or more. The bisphenol compound particularly preferable for the present invention is 2,2'-bis(4-hydroxyphenyl) propane.

The viscosity-average molecular weight of the polycarbonate resin is required to be 16,000–29,000 and, more preferably, 19,000–25,000. If the viscosity-average molecular weight is less than 16,000, the impact strength and chemical resistance of the molded article are lowered, while moldability during resin processing is deteriorated if it is in excess of 29,000.

The polyalkylene terephthalate resin (B) is obtained by the reaction of terephthalic acid or its derivatives having ester formability with glycols 2–10 in carbon number or its derivatives having ester formability.

As specific examples of the aforementioned glycol, there are included ethylene glycol, propylene glycol, 1,4-butanediol, neopentyl glycol, 1,5-pentanediol and 1,6-hexanediol, which are used either alone or in combination of two or more.

As specific examples of the polyalkylene terephthalate resin, there are included polyethylene terephthalate resins, polybuthyrene terephthalate resins, polyhexamethylene terephthalate resins and polycyclohexane dimethylene terephthalate resins, which may be used either alone or in combination of two or more. Of these, particularly preferable is polyethylene terephthalate resins for less deterioration of molded articles in heat resistance and chemical resistance.

Intrinsic viscosity of the polyalkylene terephthalate resin is preferred to be 0.4–1.2 dl/g, more preferably, 0.4–1.2 dl/g and, still more preferably, 0.6–1.0 dl/g when measured at 25° C. in a mixed solvent of phenol and tetrachloroethane in a weight ratio of 1:1. Intrinsic viscosity of less than 0.4 dl/g is not preferable since the impact strength of molded articles is lowered, while viscosity in excess of 1.2 dl/g is not preferable, either, since deterioration of moldability in resin processing occurs.

As a polymerization catalyst for use in the production of the polyalkylene terephthalate resin (B), normally known compounds of, for example, germanium type, antimony type, titanium type and tin type are usable but germanium type compounds are preferred for their marked effect against silver streaks formation. As to the method of producing such polyalkylene terephthalate resin (B), there is no particular limitation and any of the normally known methods such as melt polymerization and solid-atate polymerization may be usable.

The weight ratio of (A)/(B) may be in a range of 75/25–90/10 and, more preferably, in a range of 80/20–90/10. If this weight ratio is less than 75/25, flame retardancy, impact strength and heat resistance of molded articles are lowered, while chemical resistance of molded articles and moldability during resin processing are deteriorated if it is in excess of 90/10.

As the rubbery polymer used in the copolymer (C) in the present invention, there are included polybutadienes, polyisoprenes, random and block copolymers of styrene-butadiene, hydrogenated ones of the aforementioned block copolymers, acrylonitrile-butadiene copolymers, isoprene-butadiene copolymer rubbers, random and block copolymers of ethylene-propylene, random and block copolymers of ethylene-butene, copolymers of ethylene-α-olefin, copolymers of ethylene with unsaturated carboxylic acid esters such as ethylene-methacrylic acid ester and ethylene-butyl acrylate, acrylic ester-butadiene copolymers, acryl-type elastic polymers such as butyl acrylate-butadiene copolymers, ethylene-fatty acid vinyl copolymers such as ethylene-vinyl acetate copolymers, ethylene-propylene-ethylidenenorbornene copolymers, ethylene-propylene-non-conjugate diene copolymers such as ethylene-propylene-hexadiene copolymers, butylene-isoprene copolymers and the like, and these may be used either alone or in combination of two or more.

The rubbery polymers preferable for the present invention are polybutadienes, butadiene-styrene copolymers, butadiene-acrylic acid copolymers, butadiene-methyl acrylate copolymers, butadiene-methacrylic acid copolymers, butadiene-methyl methacrylate copolymers and the like, which may be used either alone or in combination of two or more.

As the aromatic vinyl monomer of the copolymer (C), there are included styrene, α-methylstyrene, α-ethylstyrene and the like, which may be used either alone or in combination of two or more. Particularly preferable aromatic vinyl monomers for the present invention are styrene, a -methyl styrene or a mixture thereof.

As the vinyl cyanide monomer of the copolymer (C), there are included acrylonitrile, methacrylonitrile and the like, which may be used either alone or in combination of two or more. Particularly preferable vinyl cyanide monomer for the present invention is acrylonitrile.

As the acrylic ester of the copolymer (C), there are included methyl acrylate, ethyl acrylate and butyl acrylate, which may be used either alone or in combination of two or more. Particularly preferable acrylic ester for the present invention is methyl acrylate.

As the methacrylic ester of the copolymer (C), there are included methyl methacrylate, ethyl methacrylate, butyl methacrylate and the like, which may be used either alone or in combination of two or more. Particularly favorable methacrylic ester for the present invention is methyl methacrylate.

As the maleimide-type monomer of the copolymer (C), there are included maleimide, N-methylmaleimide, N-ethylmaleimide, N-propylmaleimide, N-isopropylmaleimide, N-cyclohexylmaleimide, N-phenylmaleimide and the like, which may be used either alone or in combination of two or more. Particularly preferable maleimide monomers for the present invention are maleimide, N-phenylmaleimide, N-hexylmaleimide or mixtures of two or more thereof.

As to the rubbery polymer-individual monomer composition ratio in the copolymer (C), there is no particular limitation and the individual components are properly used according to the intended use. As such copolymer (C), preferred are, among others, graft copolymers in which the other ingredients are graft-copolymerized in the presence of the rubbery polymer and particularly preferred are AES resins (acrylonitrile-ethylene-propylene-styrene copolymers), MBS resins (methyl methacrylate-butadiene-styrene copolymers) and MB resins (methyl methacrylate-butadiene copolymers). As to the method of producing the copolymer (C), there is no particular limitation and any of the normally known methods may be used such as mass polymerization, solution polymerization, mass-suspension polymerization, suspension polymerization and emulsion polymerization. It is also possible to prepare the copolymer (C) by blending resins polymerized or copolymerized separately.

The amount to be added of the copolymer (C) used in the present invention is 1–10 parts by weight, preferably 3–7 parts by weight per 100 parts by weight of a mixture of the polycarbonate resin (A) and the polyalkylene terephthalate resin (B). If the amount to be added of the copolymer (C) is less than one part by weight, the impact strength of molded articles is insufficient, while, if it is in excess of 10 parts by weight, the heat resistance and flame retardancy of molded articles are deteriorated.

As the organic phosphorus-type flame retardant (D) used in the present invention, there are included phosphates, phosphonates, phosphinates, phosphine oxides, phosphites, phosphonites, phosphinites, phosphines and the like, and specific examples are trimethyl phosphate, triethyl phosphate, tributyl phosphate, tri(2-ethylhexyl) phosphate, tributoxyethyl phosphate, triphenyl phosphate, tricresyl phosphate, trixylenyl phosphate, tris(isopropylphenyl) phosphate, tris(phenylphenyl)phosphate, trinaphthylphosphate, cresyldiphenyl phosphate, xylenyldiphenyl phosphate, diphenyl(2-ethylhexyl)phosphate, di(isopropylphenyl)phenyl phosphate, phenylphenyldicresyl phosphate, dibutyl phosphate, monobutyl phosphate, di-2-ethylhexyl phosphate, monoisodecyl phosphate, 2-acryloyloxyethylacid phosphate, 2-methacryloyloxyethylacid phsophate, diphenyl-2-acryloyloxyethyl phosphate, diphyenyl-2-methacryloyloxyethyl phosphate, triphenyl phosphite, tris-nonylphenyl phosphite, tristridecyl phosphite, dibutyl hydrogenphosphite, triphenylphosphine oxide, tricresyl phosphine oxide, diphenylmethyl phosphonate, diethylphenyl phosphonate and the like, which may be used either alone or in combination of two or more.

Specifically, condensed phosphoric esters represented by the following formula are preferred for the less tendency to stain the die during injection molding.

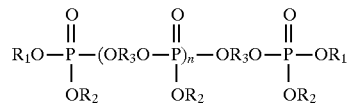

where $R_1$, $R_2$ aromatic groups or aliphatic groups, $R_1$ is a divalent aromatic group, n is 0–15. As examples of such condensed phosphoric esters, there are included resorcinolbis (diphenyl)phosphate (I), resorcinolbis (di-2,6-xylyl) phosphate (II), bisphenol A bis (dicresyl) phosphate (IV) and condensates thereof, hydroquinonebis(di-2,6-xylyl) phosphate (IV) and condensates thereof, which may be used on of two or more.

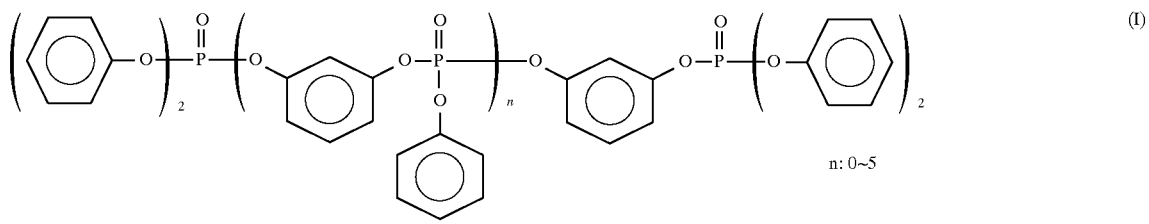

(I)

n: 0~5

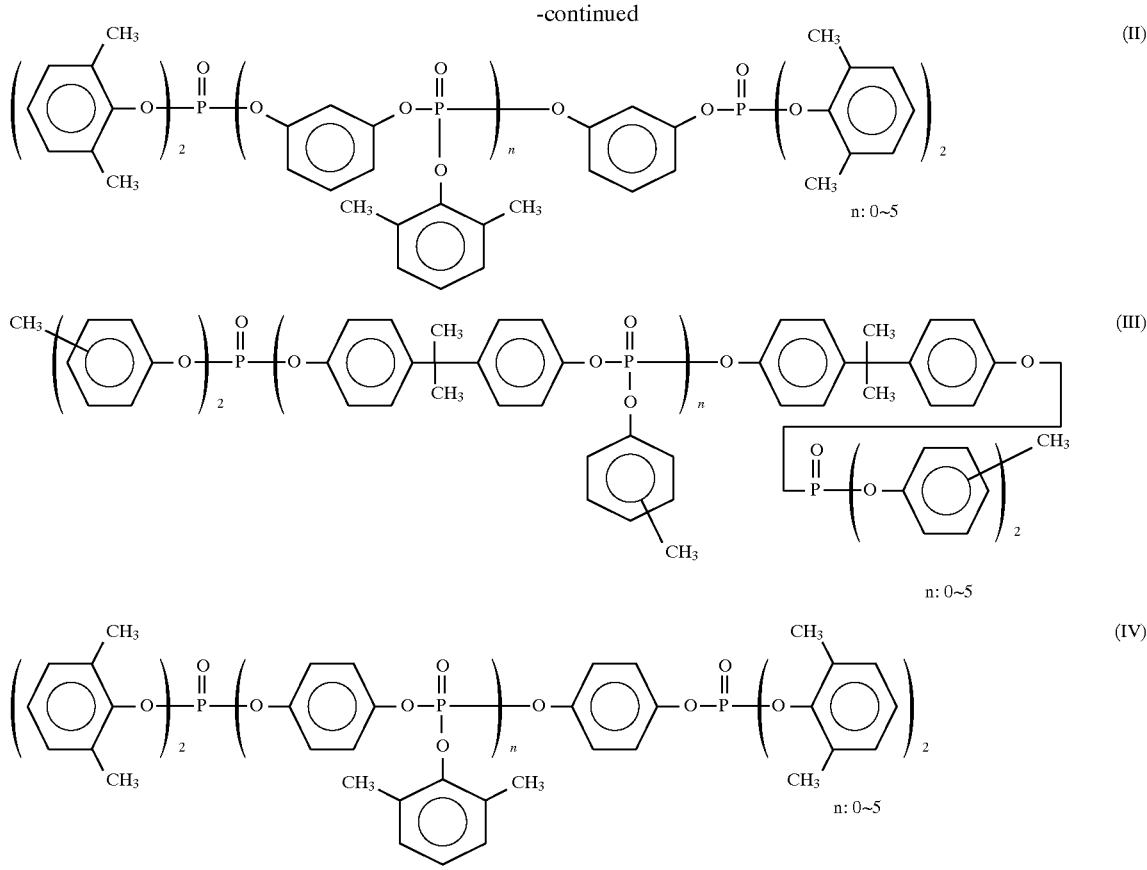

The amount to be added of the aforementioned organic phosphorus-type flame retardant (D) is in a range of 2–10 parts by weight, preferably 3–6 parts by weight per 100 parts by weight of a mixture of the polycarbonate resin (A) and the polyalkylene terephthalate resin (B). If the amount is less than 2 parts by weight, the flame retardancy of molded articles and the moldability during resin processing are insufficient, while, if it is in excess of 10 parts by weight, the impact strength, heat resistance and chemical resistance of molded articles are deteriorated.

The fluorocarbon-type resin (E) used in the present invention means any resin having fluorine atoms therein. Examples are polymonofluoroethylene, polydifluoroethylene, polytrifluoroethylene, polytetrafluoroethylene, tetrafluoroethylene /hexafluoropropylene copolymers and the like, which may be used either alone or in combination of two or more. If necessary, monomers copolymerizable with the aforementioned fluorine monomers may be used in an amount safe from deteriorating physical properties such as flame retardancy of molded articles. The molecular weight of the fluorocarbon-type resin is preferred to be 1,000,000–20,000,000, more preferably 2,000,000–10,000,000, for the required impact strength and the anti-dripping behavior during combustion. As to the method for the production of such fluorocarbon-type resins, any of the normally known methods may be used such as emulsion polymerization, suspension polymerization, mass polymerization and solution polymerization but preferred are fluorocarbon-type resins produced by emulsion polymerization with anti-dripping behavior during combustion taken into consideration.

The amount to be added of the aforementioned fluorocarbon-type resin (E) is in a range of 0.05–2 parts by weight, more preferably 0.2–1 parts by weight, per 100 parts by weight of a mixture of the polycarbonate resin (A) and the polyalkylene terephthalate resin (B). If the amount is less than 0.05 parts by weight, flame retardancy of molded articles is insufficient, while, if it is in excess of 2 parts by weight, impact strength of molded articles and moldability during resin processing are deteriorated.

The epoxy compound (F) used in the present invention is a compound having at least one epoxy group in the molecule and not containing halogens. There are included N-glycidyl phthalimide, N-glycidyl tetrahydrophthalimide, phenyl glycidyl ether, p-butylphenyl glycidyl ether, styrene oxide, neohexene oxide, ethylene glycol diglycidyl ether, polyethylene glycol diglycidyl ether, propylene glycol diglycidyl ether, polypropylene glycol diglycidyl ether, tetramethyleneglycol diglycidyl ether, polytetramethylene glycol diglycidyl ether, bisphenol A-type epoxy compounds, bisphenol S-type epoxy compounds, resorcinol-type epoxy compounds, phenolnovolac-type epoxy compounds, orthocresolnovolac-type epoxy compounds, adipic acid diglycidyl ester, sebacic acid diglycidyl ester and phthalic acid diglycidyl ester, which may be used either alone or in combination of two or more.

The epoxy equivalent of the aforementioned epoxy compound is preferred to be not more than 10,000, and more preferably not more than 1,000, for higher chemical resistance, improved resistance to heat-induced discoloration and silver streaks formation.

The amount to be added of the aforementioned epoxy compound (F) is in a range of 0.01–10 parts by weight, more preferably 0.05–5 parts by weight, per 100 parts by weight of a mixture of the polycarbonate resin (A) and the polyalkylene terephthalate resin (B). If the addition of the aforementioned epoxy compound (F) is less than 0.01 part by weight, chemical resistance and resistance to heat-induced discoloration are insufficient and silver streaks formation is inevitable, while, if it is in excess of 10 parts by weight, impact strength of molded articles is deteriorated.

An action of such epoxy compound is presumed as follows. First, the cause for marked yellowing of and silver streaks formation on molded articles of a resin composition admixed with a phosphorus-type flame retardant when compared with that admixed with a halogen-type flame retardant, is marked acceleration of decomposition of a polycarbonate resin etc. by phosphoric acid, phenols, alcohols etc. formed by the decomposition of the phosphorus-type compound under the resin processing conditions, which, in turn, causes the formation of colored compounds and volatile compounds which can be a direct cause for resin yellowing and silver streaks formation. Further, of the decomposition products of phosphorus-type compounds, phenols are known to be converted with ease into colored compounds by the reaction thereof through isomerization etc. Since such decomposition reaction is accompanied by lowering of the molecular weight of polymers, it is presumed to be largely responsible for lowering of the chemical resistance. The effect of epoxy compounds is inactivation of phosphoric acid, phenols, alcohols etc. resulting from the decomposition of phosphorus-type compounds so as to stop the link of decomposition reactions with simultaneous prevention of further lowering of the molecular weight as well as suppressing the formation of colored and volatile compounds.

The flame retardant resin composition of the present invention can be further admixed, if necessary, with one or more of other flame retardants, retardation auxiliaries, fortifiers, thermal stabilizers, antioxidants, UV-absorbents, release agents, colorants, crystalline nucleating agents, antistatic agents, fillers, lubricants, plasticizers and other polymers in not so large quantities lest the object of the present invention should be affected.

The flame retardant resin composition of the present invention can be produced in various ways including, but not limited thereby, a method of melt-kneading the polycarbonate resin (A) and polyalkylene terephthalate resin (B) in pellet or powder form including other ingredients (C), (D), (E), (F) and, if necessary, further additives by the use of a biaxial extruder. When the compounding agents, are liquid, they may be added separately to the biaxial extruder by means of a supply pump or the like.

The flame retardant resin compositions of the present invention can be molded in various forms including sheets, bottles, pipes and the like by various methods. Further, such resin compositions are halogen-free, and excelled in physical properties such as flame retardancy, impact strength, heat-resistance and moldability and, in addition thereto, excelled in chemical resistance, resistance to heat-induced discoloration and improved in silver streeks formation, they are suitable for, among others, injection molded articles of home electric appliances or OA machines.

The present invention will be described in greater details giving examples but the invention is not limited thereto.

EXAMPLE 1

82.5 parts by weight of a polycarbonate resin (called PC hereinafter) of bisphenol A 22,000 in viscosity-average molecular weight and thoroughly dried and 17.5 parts by weight of a polyethylene terephthalate resin (called PET hereinafter) sufficiently dried 0.75 dl/g in intrinsic viscosity (measured at 25° C. in a mixed solvent of phenol:tetrachloroethane=1:1 by weight: hereinafter the same) were admixed with 5 parts by weight of an MB resin (copolymer of 30% by weight of methyl methacrylate and 70% by weight of butadiene), 4.5 parts by weight of resorcinolbis(diphenyl)phosphate (ADEKASTAB PER, registered trademark of Asahi Denka Kogyo K.K.), 0.6 parts by weight of an epoxy compound, abt. 200 in epoxy equivalent (ADEKASTAB EP-22, registered trademark of Asahi Denka Kogyo K.K.), 0.6 parts by weight of a polytetrafluoroethylene (molecular weight 5,000,000) obtained by emulsion polymerization, 0.5 parts by weight of stabilizer [bis(2,6-di-t-butyl-4-methylphenyl) pentaerythritol-di-phosphite] and 0.2 parts by weight of an antioxidant (tetrakis methylene-3,5-di-t-butyl-4-hydroxyhydrocinnamate methane) were melt kneaded in a vent-type extruder 40 mm φ at 250°–270° C. and subsequently pelletized.

With the resin composition thus obtained, flame retardancy, impact strength, moldability, chemical resistance, resistance to heat-induced discoloration and silver streaks formation were measured or evaluated. The results are shown in Table 1.

Flame retardancy:

The resin in pellet form was dried for 5 hours at 120° C. and specimens were prepared by the use of an injection molder (die tightening pressure 35 tons) under conditions of 280° C. in cylinder temperature and 70 ° C. in die temperature and flame retardancy for 1/16 inch in thickness was measured according to UL-94V standards.

Impact strength:

The resin in pellet form was dried for 5 hours at 120° C. and specimens were prepared by the use of an injection molder (die tightening pressure 75 tons) under conditions of 280° C. in cylinder temperature and 70° C. in die temperature and Izod impact strength for 1/8 inch in thickness was measured according to ASTM D-256.

Heat resistance:

The resin in pellet form was dried for 5 hours at 280° C. and specimens were prepared by the use of an injection molding machine (die tightening pressure 75 tons) under conditions of 280° C. in cylinder temperature and 70 ° C. in die temperature and HDT (heat distortion temperature under a load of 18.6 kg/cm$^2$) for 1/4 inch in thickness was measured according to ASTM D-648.

Moldability:

The resin in pellet form was dried for 5 hours at 120° C. and molding was carried out by the use of an injection molder (die tightening pressure 150 tons) and a spiral die, 4 mm×4 mm in gate dimensions, 10 mm in width and 3 mm in thickness under conditions of 100 Kg/cm$^2$ in injection pressure, 280° C. in cylinder temperature and 70° C. in die temperature, and the flow length was measured.

Chemical resistance:

The resin in pellet form was dried for 5 hours at 120° C. and specimens were prepared by the use of an injection molder (die tightening pressure 75 tons) under conditions of 280° C. in cylinder temperature and 70° C. in die temperature, the resulting specimens were distorted by bending 1.0% and 1.5% and coated with salad oil and crack formation was checked 24 hours thereafter according to the following evaluation criteria.

A: Cracks are not noted.

B: Small cracks less than 1 mm in length are noted.

C: Large cracks 1 mm or more in length are noted.

D: Large cracks 1 mm or more in length are noted together with rupture of the specimen.

Resistance to heat-induced discoloration:

The resin in pellet form was dried for 5 hours at 120° C. and the hue of color samples (80 mm×50 mm×2 mm) prepared by injection molder (die tightening pressure 35 tons) under conditions of 280° C. in cylinder temperature and 70° C. in die temperature was judged visually. Further, the hues (L, a, b) of color samples obtained in a like manner and heated at 140° C. for 48 hours were measured by a differential calorimeter and the change in hue caused by heating was determined as Δ E by calculation.

Silver streaks formation:

The resin in pellet form was dried for 5 hours at 120° C., flat plates 120 mm×120 mm×3 mm molded by injection molder (die tightening pressure 75 tons) were molded under conditions of 300° C. in cylinder temperature and 70° C. in die temperature and the silver streaks formation noted with the 10th shot molding was judged according to the following evaluation criteria.

A: Silver streaks formation is not noted with any of the 10 moldings.

B: Silver streaks formation is noted with only one of the 10 moldings.

C: Silver streaks formation is noted with two or more of the 10 moldings.

D: Silver streaks formation is noted with all of the 10 moldings.

EXAMPLE 2

Example 2 was carried out in the same way as Example 1 except that a PC whose viscosity-average molecular weight was 22,000 was used instead of the PC whose viscosity-average molecular weight was 19,000. The results are shown in Table 1.

EXAMPLE 3

Example 3 was carried out in the same way as Example 1 except that the quantity of the PC was increased from 72.5 parts by weight to 78.0 parts by weight and the quantity of the PET was increased from 17.5 parts by weight to 22.0 parts by weight. The results are shown in Table 1.

EXAMPLE 4

Example 4 was carried out in the same way as Example 1 except that the quantity of the resorcinolbis(diphenyl) phosphate was increased from 4.5 parts by weight to 6.0 parts by weight. The results are shown in Table 1.

EXAMPLE 5

Example 5 was carried out in the same way as Example 1 except that 5.3 parts by weight of bisphenol A bis(dicresyl) phosphate(PHOSFLEX 580, registered trademark of Akzolashima) was used instead of 4.5 parts by weight of the resorcinolbis(diphenyl)phosphate. The results are shown in Table 1.

EXAMPLE 6

Example 6 was carried out in the same way as Example 1 except that 5.8 parts by weight of resorcinolbis(di-2,6-xylyl)phosphate was used instead of 4.5 parts by weight of the resorcinolbis(diphenyl)phosphate. The results are shown in Example 1.

EXAMPLE 7

Example 7 was carried out in the same way as Example 1 except that 5.3 parts by weight of hydroquinonebis(di-2,6-xylyl)phosphate was used instead of 4.5 parts by weight of the resorcinolbis(diphenyl)phosphate. The results are shown in Table 1.

EXAMPLE 8

Example 8 was carried out in the same way as Example 1 except that cresyldiphenyl phosphate was used instead of the resorcinolbis(diphenyl)phosphate. The results are shown in Table 1.

EXAMPLE 9

Example 9 was carried out in the same way as Example 1 except that the quantity of the epoxy compound was increased from 0.6 parts by weight to 1.5 parts by weight. The results are shown in Table 1.

EXAMPLE 10

Example 10 was carried out in the same way as Example 1 except that EPIKOTE 1007 (registered trademark of Yuka Shell Epoxy Kogyo K.K., epoxy equivalent: abt. 2,000) was used instead of ADEKASTAP EP-22 as an epoxy compound. The results are shown in Table 1.

TABLE 1

|  |  | Examples | | | | | | | | | |
|---|---|---|---|---|---|---|---|---|---|---|---|
|  |  | 1 | 2 | 3 | 4 | 5 | 6 | 7 | 8 | 9 | 10 |
| A:PC resin | Mw:22000 | 82.5 |  | 78.0 | 82.5 | 82.5 | 82.5 | 82.5 | 8.2.5 | 82.5 | 82.5 |
|  | Mw:19000 |  | 82.5 |  |  |  |  |  |  |  |  |
| B:PET resin | Cat. germanium | 17.5 | 17.5 | 22.0 | 17.5 | 17.5 | 17.5 | 17.5 | 17.5 | 17.5 | 17.5 |
|  | Cat. antimony |  |  |  |  |  |  |  |  |  |  |
| C:copolymer | *1 (1) | 5.0 | 5.0 | 5.0 | 5.0 | 5.0 | 5.0 | 5.0 | 5.0 | 5.0 | 5.0 |
|  | (2) |  |  |  |  |  |  |  |  |  |  |
| D:organic | *2 (1) | 4.5 | 4.5 | 4.5 | 6.0 |  |  |  |  | 4.5 | 4.5 |
| phosphorus | (2) |  |  |  |  | 5.3 |  |  |  |  |  |
| flame retardant | (3) |  |  |  |  |  | 5.8 |  |  |  |  |
|  | (4) |  |  |  |  |  |  | 5.3 |  |  |  |
|  | (5) |  |  |  |  |  |  |  | 4.5 |  |  |
| E: polytetrafluoroethylene |  | 0.6 | 0.6 | 0.6 | 0.6 | 0.6 | 0.6 | 0.6 | 0.6 | 0.6 | 0.6 |
| F:epoxy compound | *3 (1) | 0.6 | 0.6 | 0.6 | 0.6 | 0.6 | 0.6 | 0.6 | 0.6 | 1.5 |  |
|  | (2) |  |  |  |  |  |  |  |  |  | 0.6 |
|  | (3) |  |  |  |  |  |  |  |  |  |  |
|  | (4) |  |  |  |  |  |  |  |  |  |  |
| Stabilizer |  | 0.5 | 0.5 | 0.5 | 0.5 | 0.5 | 0.5 | 0.5 | 0.5 | 0.5 | 0.5 |

TABLE 1-continued

|  | Examples | | | | | | | | | |
|---|---|---|---|---|---|---|---|---|---|---|
|  | 1 | 2 | 3 | 4 | 5 | 6 | 7 | 8 | 9 | 10 |
| Antioxidant | 0.2 | 0.2 | 0.2 | 0.2 | 0.2 | 0.2 | 0.2 | 0.2 | 0.2 | 0.2 |
| Izod (kg · cm/cm) | 78 | 75 | 68 | 75 | 77 | 75 | 76 | 62 | 74 | 76 |
| UL 94 V test | V-0 | V-0 | V-0 | V-0 | V-0 | V-0 | V-0 | V-0 | V-0 | V-0 |
| HDT(°C.) | 107 | 106 | 103 | 105 | 107 | 106 | 106 | 101 | 105 | 106 |
| Flow length (mm) | 720 | 800 | 780 | 750 | 710 | 700 | 710 | 830 | 730 | 690 |
| Chemical 1.0% strain*24 hr | A | A | A | A | A | A | A | A | A | A |
| resistance 1.5% strain*24 hr | A | A | A | A | A | A | A | A | A | B |
| Heat-induced After molding discoloration ΔE after | White | White | White | White | White | White | White | White | White | White |
| resistance heating | 7 | 7 | 6 | 8 | 7 | 7 | 6 | 9 | 4 | 12 |
| Silver Streaks formation | A | A | A | A | A | A | A | A | A | B |

*1 (1): MB resin(methyl methacrylate-butadiene copolymer)
(2): MBS resin(methyl methacrylate-butadiene styrene copolymer)
*2 (1): Resorcinolbis(diphenyl)phosphate
(2): Bisphenol A bis(diphenyl)phosphate
(3): Resorcinolbis (di-2,6-xylyl)phosphate
(4): Hydroquinune bis (di-2,6-xylyl)phosphate
(5): Cresyldiphenyl phosphate
*3 (1): ADEKASTAB EP-22 manufacturerd by Asahi Denka Kogyo K.K.
(2): EPIKOTE 1007 manufacturerd by Yuka Shell Epoxy K.K.
(3): DENACOL EX-146 manufacturerd by Nagase Kasei Kogyo K.K.
(4): DENACOL EX-411 manufacturerd by Nagase Kasei Kogyo K.K.

EXAMPLE 11

Example 11 was carried out in the same way as Example 1 except that DENACOL EX-146 (registered trademark of Nagase Kasei Kogyo K.K., epoxy equivalent: abt. 226) was used instead of ADEKASTAB EP-22 as an epoxy compound. The results are shown in Table 2.

EXAMPLE 12

Example 12 was carried out in the same way as Example 1 except that DENACOL EX-411 (registered trademark of Nagase Kasei Kogyo K.K., epoxy equivalent: abt. 231) was used instead of ADEKASTAB EP-22 as epoxy compound. The results are shown in Table 2.

EXAMPLE 13

Example 13 was carried out in the same way as Example 1 except that an MBS resin (copolymer of 8% by weight of methyl methacrylate, 70% by weight of butadiene and 22% by weight of styrene) was used instead of the MB resin. The results are shown in Table 2.

EXAMPLE 14

Example 14 was carried out in the same way as Example 1 except that the quantity of the MB resin is increased from 5.0 parts by weight to 7.0 parts by weight. The results are shown in Table 2.

EXAMPLE 15

Example 15 was carried out in the same way as Example 1 except that the quantity of the polytetrafluoroethylene was increased from 0.6 parts by weight to 0.9 parts by weight. The results are shown in Table 2.

EXAMPLE 16

Example 16 was carried out in the same way as Example 1 except that 17.5 parts by weight of a thoroughly dried PET resin whose intrinsic viscosity (measured at 25° C. in a mixed solvent of phenol:tetrachloroethane=1:1 by weight, herein after the same) is 0.65 dl/g, which was prepared by the use of as an antimony-type compound as a polymerization catalyst was used. The results are shown in Table 2.

TABLE 2

|  |  |  | Examples | | | | | |
|---|---|---|---|---|---|---|---|---|
|  |  |  | 11 | 12 | 13 | 14 | 15 | 16 |
| A:PC resin | Mw:22000 |  | 82.5 | 82.5 | 82.5 | 82.5 | 82.5 | 82.5 |
|  | Mw:19000 |  |  |  |  |  |  |  |
| B:PET resin | Cat. germanium |  | 17.5 | 17.5 | 17.5 | 17.5 | 17.5 |  |
|  | Cat. antimony |  |  |  |  |  |  | 17.5 |
| C:copolymer | *1 | (1) | 5.0 | 5.0 |  | 7.0 | 5.0 | 5.0 |
|  |  | (2) |  |  | 5.0 |  |  |  |
| D:organic phosphorus flame retardant | *2 | (1) | 4.5 | 4.5 | 4.5 | 4.5 | 4.5 | 4.5 |
|  |  | (2) |  |  |  |  |  |  |
|  |  | (3) |  |  |  |  |  |  |
|  |  | (4) |  |  |  |  |  |  |
|  |  | (5) |  |  |  |  |  |  |
| E: polytetrafluoroethylene |  |  | 0.6 | 0.6 | 0.6 | 0.6 | 0.9 | 0.6 |
| F:epoxy compound | *3 | (1) |  |  | 0.6 | 0.6 | 0.6 | 0.6 |
|  |  | (2) |  |  |  |  |  |  |
|  |  | (3) | 0.6 |  |  |  |  |  |
|  |  | (4) |  | 0.6 |  |  |  |  |

TABLE 2-continued

|  | Examples | | | | | |
| --- | --- | --- | --- | --- | --- | --- |
|  | 11 | 12 | 13 | 14 | 15 | 16 |
| Stabilizer | 0.5 | 0.5 | 0.5 | 0.5 | 0.5 | 0.5 |
| Antioxidant | 0.2 | 0.2 | 0.2 | 0.2 | 0.2 | 0.2 |
| Izod (kg · cm/cm) | 70 | 71 | 73 | 77 | 78 | 76 |
| UL 94 V test | V-0 | V-0 | V-0 | V-0 | V-0 | V-0 |
| HDT (°C.) | 102 | 101 | 106 | 101 | 106 | 106 |
| Flow Length (mm) | 740 | 720 | 700 | 750 | 690 | 780 |
| Chemical 1.0% strain*24 hr | A | A | A | A | A | A |
| resistance 1.5% strain*24 hr | A | A | A | A | A | A |
| Heat-induced After molding discoloration ΔE after resistance heating | White 8 | White 7 | White 8 | White 7 | White 10 | White 7 |
| Silver Streaks formation | A | A | A | A | A | B |

*1 (1): MB resin(methyl methacrylate-butadiene copolymer)
(2): MBS resin(methyl methacrylate-butadiene styrene copolymer)
*2 (1): Resorcinolbis(diphenyl)phosphate
(2): Bisphenol A bis(diphenyl)phosphate
(3): Resorcinolbis (di-2,6-xylyl)phosphate
(4): Hydroquinune bis (di-2,6-xylyl)phosphate
(5): Cresyldiphenyl phosphate
*3 (1): ADEKASTAB EP-22 manufacturerd by Asahi Denka Kogyo K.K.
(2): EPIKOTE 1007 manufacturerd by Yuka Shell Epoxy K.K.
(3): DENACOL EX-146 manufacturerd by Nagase Kasei Kogyo K.K.
(4): DENACOL EX-411 manufacturerd by Nagase Kasei Kogyo K.K.

Comparative example 1

Comparative example 1 was carried out in the same way as Example 1 except that the epoxy compound was not used. The results are in Table 3.

Comparison with Example 1 shows that chemical resistance and resistance to heat-induced discoloration are both lowered and silver atreaks formation is increased, when the epoxy compound is not used.

Comparative example 2

Comparative example 2 was carried out in the same way as Example 1 except that the resorcinolbis(diphenyl) phosphate was not used. The results are shown in Table 3.

Comparison with Example 1 shows that flame retardancy and moldability are both lowered when the phosphorus-type flame retardant is not used.

Comparative example 3

Comparative example 3 was carried out in the same way as Example 1 except that the polytetrafluoroethylene was not used. The result was as shown in Table 3.

Comparison with Example 1 shows that flame retardancy is lowered when the polytetrafluoroethylene is not used.

Comparative example 4:

Comparative example 4 was carried out in the same way as Example 1 except that the MB resin was not used. The results are shown in Table 3.

Comparison with Example 1 shows that impact strength is lowered when the MB resin is not used.

Comparative example 5

Comparative example 5 was carried out in the same way as Example 1 except that a PC 15,000 in viscosity-average molecular weight is used instead of the PC 22,000 in viscosity-average molecular weight. The results are shown in Table 3.

Comparison with Example 1 shows that both impact strength and chemical resistance are lowered when a PC of less than 16,000 in viscosity-average molecular weight is used.

Comparative example 6

Comparative example 6 was carried out in the same way as Example 1 except that a PC less than 30,000 in viscosity-average molecular weight was used instead of the PC 22,000 in viscosity-average molecular weight.

Comparison with Example 1 shows that moldability is lowered when a PC of more than 29,000 in viscosity-average molecular weight is used.

Comparative example 7

Comparative example 7 was carried out in the same way as Example 1 except that the quantity of the PC was increased from 82.5 parts by weight to 98.0 parts by weight and that of the PET was decreased from 17.5 parts by weight to 2.0 parts by weight. The results are shown in Table 3.

Comparison with Example 1 shows that both chemical resistance and moldability are lowered when the weight ratio of PET/PC is in excess of 90/10.

Comparative example 8

Comparative example 8 was carried out in the same way as Example 1 except that the quantity of the PC was decreased from 82.5 parts by weight to 70.0 parts by weight and that of the PET was increased from 17.5 parts by weight to 30.0 parts by weight. The results are shown in Table 3.

Comparison with Example 1 shows that impact strength, flame retardancy and heat resistance are lowered when the weight ratio of PET/PC is less than 75/25.

Comparative example 9

Comparative example 9 was carried out in the same way except that the quantity of the MB resin was increased from 5.0 parts by weight to 12.0 parts by weight. The results are shown in Table 3.

Comparison with Example 1 shows that flame retardancy, heat resistance and chemical resistance are all lowered when the quantity of the MB resin is in excess of 10 parts by weight.

Comparative example 10

Comparative example 10 was carried out in the same way as Example 1 except that the quantity of the resorcinolbis (diphenyl)phosphate is increased from 4.5 parts by weight to 12.0 parts by weight. The results are shown in Table 3.

Comparison with Example 1 shows that impact strength, heat resistance and chemical resistance are all lowered when the quantity of the phosphorus-type flame retardant is in excess of 10 parts by weight.

TABLE 3

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| A:PC resin | Mw:22000 | 82.5 | 82.5 | 82.5 | 82.5 | | | 98.0 | 70.0 | 82.5 | 82.5 |
| | Mw:15000 | | | | | 82.5 | | | | | |
| | Mw:30000 | | | | | | 82.5 | | | | |
| B:PET resin | | 17.5 | 17.5 | 17.5 | 17.5 | 17.5 | 17.5 | 2.0 | 30.0 | 17.5 | 17.5 |
| C:copolymer | *1 (1) | 5.0 | 5.0 | 5.0 | | 5.0 | 5.0 | 5.0 | 5.0 | 12.0 | 5.0 |
| | (2) | | | | | | | | | | |
| Organic nitrogen-type flame retardant | *2 | | | | | | | | | | |
| Antimony trioxide | | | | | | | | | | | |
| D:organic phosphorus-type flame retardant | *3 (1) | 4.5 | | 4.5 | 4.5 | 4.5 | 4.5 | 4.5 | 4.5 | 4.5 | 12.0 |
| | (2) | | | | | | | | | | |
| | (3) | | | | | | | | | | |
| | (4) | | | | | | | | | | |
| | (5) | | | | | | | | | | |
| | (6) | | | | | | | | | | |
| E:polytetrafluoroethylene | | 0.6 | 0.6 | | 0.6 | 0.6 | 0.6 | 0.6 | 0.6 | 0.6 | 0.6 |
| F:epoxy compound *4 | | | 0.6 | 0.6 | 0.6 | 0.6 | 0.6 | 0.6 | 0.6 | 0.6 | 0.6 |
| Stabilizer | | 0.5 | 0.5 | 0.5 | 0.5 | 0.5 | 0.5 | 0.5 | 0.5 | 0.5 | 0.5 |
| Antioxidant | | 0.2 | 0.2 | 0.2 | 0.2 | 0.2 | 0.2 | 0.2 | 0.2 | 0.2 | 0.2 |
| Izod (kg · cm/cm) | | 50 | 72 | 77 | 10 | 9 | 79 | 80 | 10 | 78 | 7 |
| UL 94 V test | | V-0 | V-2 | V-2 | V-0 | V-0 | V-0 | V-0 | V-1 | V-2 | V-0 |
| HDT (°C.) | | 103 | 120 | 107 | 110 | 104 | 108 | 112 | 95 | 92 | 95 |
| Flow Length (mm) | | 760 | 580 | 750 | 620 | 850 | 490 | 480 | 340 | 810 | 870 |
| Chemical 1.0% strain*24 hr | | A | A | A | A | A | A | D | A | D | D |
| resistance 1.5% strain*24 hr | | D | A | A | A | C | A | D | A | D | |
| Heat-induced After molding discoloration ΔE after | | Yellow | White | White | White | White | White | White | White | White | White |
| resistance heating | | 41 | 9 | 8 | 7 | 10 | 7 | 8 | 6 | 11 | 12 |
| Silver Streaks formation | | D | A | A | A | A | A | A | A | A | B |

*1 (1): MB resin(methyl methacrylate-butadiene copolymer)
(2): MBS resin(methyl methacrylate-butadiene copolymer)
*2 Brominated polystyrene resin
*3 (1): Resorcinolbis(diphenyl)phosphate
(2): Bisphenol A bis(diphenyl)phosphate
(3): Resorcinolbis(di-2,6-xylyl)phosphate
(4): Cresyldiphenyl phosphate
(5): Phosphoric diester
(6): Potassium salt of phosphoric diester
*4 ADEKASTAB EP-22 manufacturerd by Asahi Denka Kogyo K. K.

Comparative example 11

Comparative example 11 was carried out in the same way as Example 1 except that the quantity of the polytetraflouoroethylene was increased from 0.6 parts by weight to 2.5 parts by weight. The results are shown in Table 4.

Comparison with Example 1 shows that impact strength and moldability are both lowered when the quantity of the polytetrafluoroethylene is in excess of 2 parts by weight.

Comparative example 12

Comparative example 12 was carried out in the same way as Example 1 except that the quantity of the epoxy compound was increased from 0.6 parts by weight to 12 parts by weight. The results are shown in Table 4.

Comparison with Example 1 shows that impact strength and chemical resistance are both lowered when the quantity of the epoxy compound is in excess of 10 parts by weight.

Comparative example 13

Comparative example 13 was carried out in the same way as Example 1 except that the quantity of the PC was increased from 82.5 parts by weight to 94.0 parts by weight, that of the PET was decreased from 17.5 parts by weight to 6.0 parts by weight, that of the resorcinolbis(diphenyl) phosphate was increased from 4.5 parts by weight to 15.0 parts by weight, that of the polytetrafluoroethylene was increased from 0.6 parts by weight to 5.0 parts by weight, the MB resin was replaced with 6.0 parts by weight of the MBS resin and the epoxy compound was omitted. The results are shown in Table 4.

Comparison with Example 1 shows that heat resistance, moldability, chemical resistance and resistance to heat-induced discoloration are all lowered and silver streaks formation is increased, when the PET/PC weight ratio is in excess of 90/10, the quantity of organic phosphorus-type flame retardant is in excess of 10 parts by weight, that of the polytetrafluoroethylene is in excess of 2 parts by weight and no epoxy compound is used.

Comparative example 14

Comparative example 14 was carried out in the same way as Example 1 except that no epoxy compound was used and a phosphoric diester and a potassium salt thereof having structural formulae (V) and (VI) were used 0.1 part by weight respectively. The results are shown in Table 4.

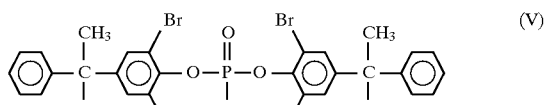

(V)

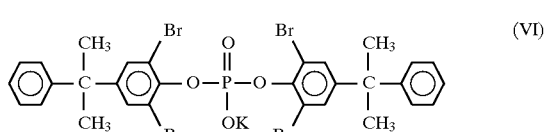

(VI)

Comparison with Example 1 shows that chemical resistance and resistance to heat-induced discoloration are both lowered and silver streaks formation is increased, when the phosphoric diester and the potassium salt thereof are used without use of the epoxy compound.

Comparative example 15

Comparative example 15 was carried out in the same way as Example 1 except that 10.0 parts by weight of bisphenol A (dicresyl)phosphate and 5.0 parts by weight of cresylphenyl phosphate were used in place of the resorcinolbis (diphenyl)phosphate without use of the epoxy compound. The results are shown in Table 4.

Comparison with Example 1 shows that impact strength, heat resistance, chemical resistance and resistance to heat-induced discoloration are all lowered and silver atreaks formation is increased, when more than 10 parts by weight of the organic phosphorus-type flame retardant is added without use of the epoxy compound.

Comparative example 16

Comparative example 16 was carried out in the same way as Example 1 except that resorcinolbis(di-2,6-xylyl) phosphate was used in place of the resorcinolbis(diphenyl) phosphate without use of the epoxy compound. The results are shown in Table 4.

Comparison with Example 1 shows that chemical resistance and resistance to heat-induced discoloration are both lowered and silver streaks formation is increased when no epoxy compound is used.

Comparative example 17

Comparative example 17 was carried out in the same way as Example 1 except that 12.0 parts by weight of a brominated polystyrene resin (PIROCHECK 68 PB, registered trademark of Nissan Ferro K.K.) was used without use of the epoxy compound and the resorcinolbis(diphenyl)phosphate. The results are shown in Table 4.

Comparison with Example 1 shows that chemical resistance and resistance to post-heating hue variation in resistance to heat-induced discoloration are lowered with more marked silver streaks formation, when the organic bromine-type flame retardant was used without use of the epoxy compound.

Comparative example 18

Comparative example 18 was carried out in the same way as Example 1 except that 8.0 parts by weight of the brominated polystyrene resin (PIROCHECK 68 PB, registered trademark of Nissan Ferro K.K.) and 3.0 parts by weight of antimony trioxide were used without use of the epoxy compound and the resorcinolbis(diphenyl)phosphate. The results are shown in Table 4.

Comparison with Example 1 shows that chemical resistance and resistance to post-heating change of hue in resistance to heat-induced discoloration are decreased and silver streaks formation is increased when the organic bromine-type flame retardant and antimony trioxide are used without use of the epoxy compound.

TABLE 4

| | | Comparative Examples | | | | | | | |
|---|---|---|---|---|---|---|---|---|---|
| | | 11 | 12 | 13 | 14 | 15 | 16 | 17 | 18 |
| A:PC resin | Mw:22000 | 82.5 | 82.5 | 94.0 | 82.5 | 82.5 | 82.5 | 82.5 | 82.5 |
| | Mw:15000 | | | | | | | | |
| | Mw:30000 | | | | | | | | |
| B:PET resin | | 17.5 | 17.5 | 6.0 | 17.5 | 17.5 | 17.5 | 17.5 | 17.5 |
| C:copolymer | *1 (1) | 5.0 | 5.0 | | 5.0 | 5.0 | 5.0 | 5.0 | 5.0 |
| | (2) | | | 6.0 | | | | | |
| Organic nitrogen-type flame retardant | *2 | | | | | | | 12.0 | 8.0 |
| Antimony trioxide | | | | | | | | | 3.0 |
| D:organic phosphorus-type flame retardant | *3(1) | 4.5 | 4.5 | 15.0 | 4.5 | | | | |
| | (2) | | | | | 10.0 | | | |
| | (3) | | | | | | 4.5 | | |
| | (4) | | | | | 5.0 | | | |
| | (5) | | | | 0.1 | | | | |
| | (6) | | | | 0.1 | | | | |
| E:polytetrafluoroethylene | | 2.5 | 0.6 | 5.0 | 0.6 | 0.6 | 0.6 | 0.6 | 0.6 |
| F:epoxy compound *4 | | 0.6 | 12.0 | | | | | | |
| Stabilizer | | 0.5 | 0.5 | 0.5 | 0.5 | 0.5 | 0.5 | 0.5 | 0.5 |
| Antioxidant | | 0.2 | 0.2 | 0.2 | 0.2 | 0.2 | 0.2 | 0.2 | 0.2 |
| Izod (kg · cm/cm) | | 12 | 10 | 50 | 60 | 6 | 58 | 70 | 75 |
| UL 94 V test | | V-0 | V-0 | V-0 | V-0 | V-0 | V-0 | V-0 | V-0 |
| HDT (°C.) | | 104 | 101 | 93 | 103 | 96 | 104 | 120 | 124 |
| Flow Length (mm) | | 390 | 780 | 420 | 800 | 900 | 740 | 750 | 780 |
| Chemical 1.0% strain*24 hr | | A | A | D | B | D | A | A | A |
| resistance 1.5% strain*24 hr | | A | C | D | D | D | D | D | D |
| Heat-induced discoloration ΔE after | After molding | White | White | Yellow | Yellow | Yellow | Yellow | White | White |
| resistance | heating | 10 | 9 | 42 | 39 | 38 | 37 | 22 | 23 |
| Silver Streaks formation | | A | A | D | D | D | D | C | C |

*1 (1): MB resin(methyl methacrylate-butadiene copolymer)
(2): MBS resin(methyl methacrylate-butadiene copolymer)
*2 Brominated polystyrene resin
*3 (1): Resorcinolbis(diphenyl)phosphate
(2): Bisphenol A bis(diphenyl)phosphate
(3): Resorcinolbis(di-2,6-xylyl)phosphate
(4): Cresyldiphenyl phosphate
(5): Phosphoric diester
(6): Potassium salt of phosphoric diester
*4 ADEKASTAB EP-22 manufacturerd by Asahi Denka Kogyo K. K.

Industrial Applicability

As mentioned above, flame retardant rasin compositions of the present invention are halogen-free and meet higher requirements of chemical resistance, resistance to heat-induced discoloration and prevention of silver streaks formation in addition to excellent physical properties such as flame retardancy, impact strength and moldability, and hence they are preferred for use as materials for injection molded articles of home electric appliances, OA (Office Automation) machines and the like.

We claim:

1. A flame retardant resin composition comprising the following components (A), (B), (C), (D), (E) and (F), wherein 1–10 parts by weight of (C), 2–10 parts by weight of (D), 0.05–2 parts by weight of (E) and 0.01–10 parts by weight of (F) are contained per 100 parts by weight of a resin whose weight ratio of (A)/(B) is 75/25–90/10:

(A) a polycarbonate resin having a viscosity-average molecular weight of 16,000–29,000, (B) a polyalkylene terephthalate resin, (C) a copolymer containing a rubbery polymer and at least one selected from the group consisting of aromatic vinyl monomers, vinyl cyanide monomers, acrylic acid, acrylic esters, methacrylic acid, methacrylic esters and maleimide monomers as components, (D) an organic phosphorus flame retardant, (E) a fluorocarbon resin, and (F) an epoxy compound not containing halogens.

2. The flame retardant resin composition according to claim 1, wherein the polyalkylene terephthalate resin (B) is a polyethylene terephthalate resin.

3. The flame retardant resin composition according to claim 2, wherein the polyethylene terephthalate resin is one obtained with a germanium compound as a polymerization catalyst.

4. The flame retardant resin composition according claims 1–3, wherein the organic phosphorus flame retardant (D) is a condensed phosphoric ester the general formula given below:

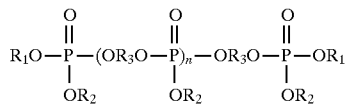

where $R_1$ $R_2$ are monovalent aromatic groups or aliphatic divalent aromatic group and n is 0–15.

* * * * *